US008903334B2

(12) United States Patent
Lieu et al.

(10) Patent No.: US 8,903,334 B2
(45) Date of Patent: *Dec. 2, 2014

(54) DETACHABLE WIRELESS TERMINAL

(71) Applicant: Mochis Investment LLC, Dover, DE (US)

(72) Inventors: Winston Hong Lieu, Holmdel, NJ (US); Haixiong Zhao, Holmdel, NJ (US)

(73) Assignee: Mochis Investment LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/729,975

(22) Filed: Dec. 28, 2012

(65) Prior Publication Data

US 2013/0122897 A1 May 16, 2013

Related U.S. Application Data

(63) Continuation of application No. 11/279,564, filed on Apr. 12, 2006, now Pat. No. 8,358,983.

(51) Int. Cl.
*H04B 1/38* (2006.01)
*H04M 1/02* (2006.01)
*H04W 88/06* (2009.01)
*H04M 1/725* (2006.01)
*H04M 1/677* (2006.01)

(52) U.S. Cl.
CPC ............ *H04W 88/06* (2013.01); *H04M 1/0256* (2013.01); *H04M 1/6775* (2013.01); *H04M 1/72541* (2013.01)
USPC .. 455/90.2; 455/550.1; 455/462; 379/142.12; 379/110.01

(58) Field of Classification Search
None
See application file for complete search history.

(56) References Cited

U.S. PATENT DOCUMENTS

| 5,285,443 | A | 2/1994 | Patsiokas et al. |
| 5,566,226 | A | 10/1996 | Mizoguchi et al. |
| 5,854,984 | A | 12/1998 | Buhrmann et al. |
| 6,035,214 | A | 3/2000 | Henderson |
| 6,188,917 | B1 | 2/2001 | Laureanti |
| 6,292,148 | B1 | 9/2001 | Matsuura et al. |
| 6,760,600 | B2 | 7/2004 | Nickum |
| 6,766,175 | B2 | 7/2004 | Uchiyama |
| 6,912,399 | B2 | 6/2005 | Zirul et al. |
| 6,950,652 | B2 | 9/2005 | Janssen et al. |
| 7,072,688 | B2 | 7/2006 | Bodnar et al. |
| 7,200,416 | B2 | 4/2007 | Aisenberg |
| 7,366,541 | B2 | 4/2008 | Goebel et al. |
| 7,706,850 | B2 | 4/2010 | Parivash |
| 2002/0172336 | A1 | 11/2002 | Postma et al. |
| 2002/0198020 | A1* | 12/2002 | Mooney ........................ 455/553 |
| 2003/0027547 | A1 | 2/2003 | Wade |
| 2003/0050011 | A1* | 3/2003 | Palermo et al. ................. 455/41 |
| 2003/0144030 | A1 | 7/2003 | Newmark |
| 2004/0202052 | A1 | 10/2004 | Lev |

(Continued)

*Primary Examiner* — Zhiyu Lu

(74) *Attorney, Agent, or Firm* — Brundidge & Stanger, P.C.

(57) ABSTRACT

A limited-capability wireless terminal that is particularly well adapted for use in emergency situations, recreational activities and occasional calls is disclosed. The detachable wireless terminal does not have a display or a numeric keypad. Rather, the detachable wireless terminal has several "one-touch" buttons that place a call to pre-programmed phone numbers when pressed. The detachable wireless terminal is small enough and light enough to be worn around a user's neck, received by a lanyard or a necklace. The wireless terminal detachably couples to a relatively larger docking device, which can be used to program it.

18 Claims, 4 Drawing Sheets

(56) References Cited

U.S. PATENT DOCUMENTS

| | | |
|---|---|---|
| 2005/0119014 A1 | 6/2005 | Bandell et al. |
| 2005/0176461 A1 | 8/2005 | Bozzone et al. |
| 2006/0071798 A1* | 4/2006 | Kiff et al. .................. 340/573.1 |
| 2006/0258289 A1 | 11/2006 | Dua |
| 2006/0282021 A1 | 12/2006 | DeVaul et al. |
| 2007/0040652 A1 | 2/2007 | Quatro |

* cited by examiner

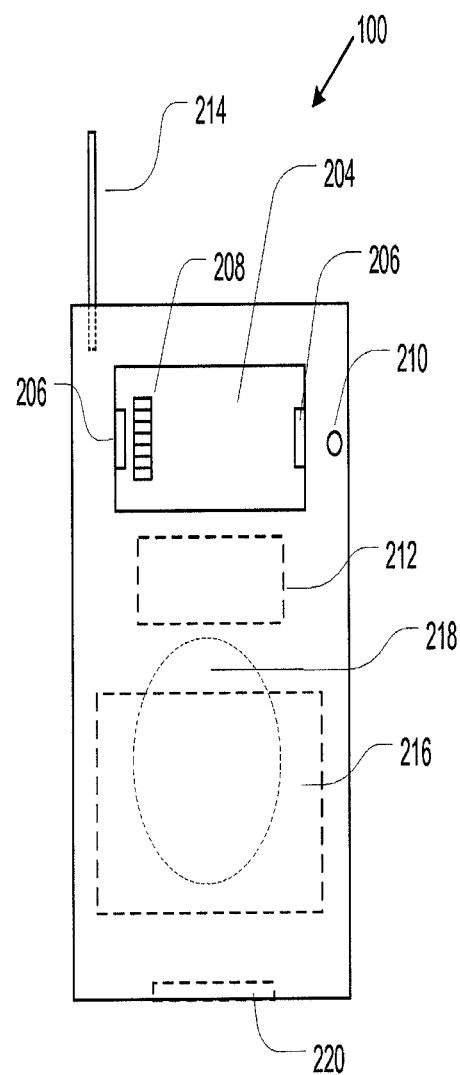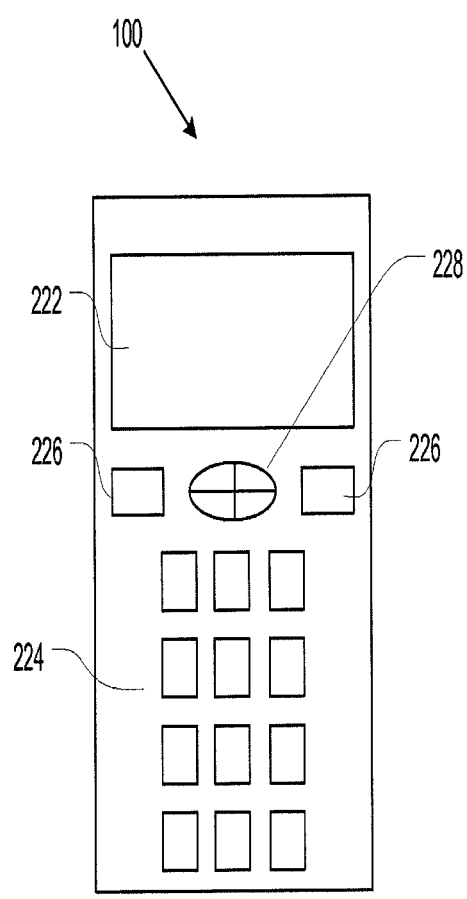
Figure 2A
Figure 2B

Figure 5
Figure 6
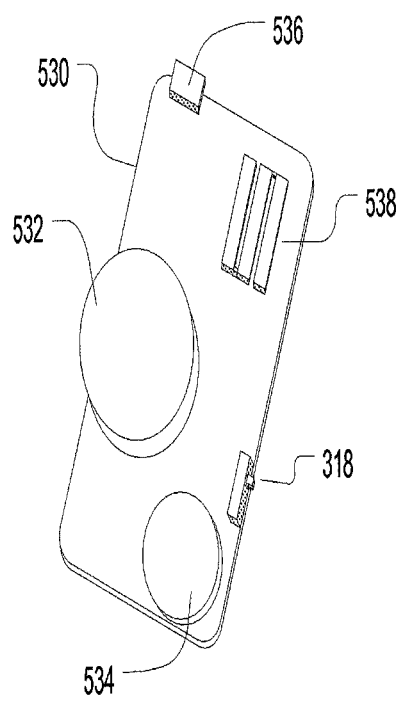
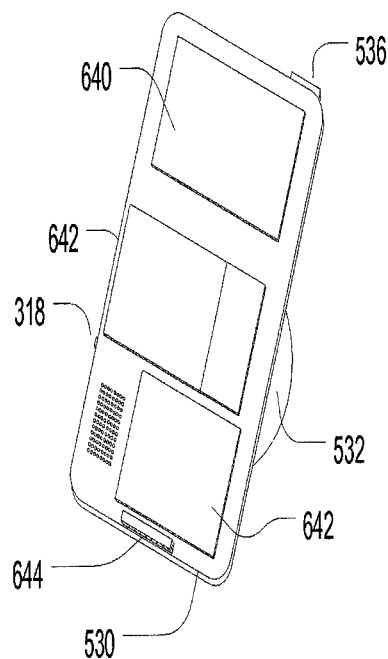

DETACHABLE WIRELESS TERMINAL

CROSS REFERENCE TO RELATED APPLICATIONS

The present application is a continuation application of U.S. application Ser. No. 11/279,564, filed Apr. 12, 2006, the entire contents of which are incorporated herein by reference.

FIELD OF THE INVENTION

The present application relates to wireless telecommunications.

BACKGROUND OF THE INVENTION

Although cellular phones are now relatively small in size and light in weight, they are still too bulky or too fragile for use in certain situations. For example, adults who engage in recreational activities such as running, biking, cardiovascular or strength training at a health club, and the like are unlikely to carry a cell phone during the performance of these activities.

In some cases, the aversion to carrying the cell phone is due to the nature of the activity itself. For example, a runner might wish to avoid the discomfort of the device bouncing about in a pocket. In some other cases, the clothing that is worn during the activity is ill-suited for carrying a cell phone. In particular, the garment might not have any pockets or, if it does, they might not be suitable for preventing a cellular phone from falling out during the activity, thereby posing a risk of loss or damage to the phone.

While an obvious solution to this problem is to reduce the size of the cellular phone, this is not practical for various reasons.

Specifically, and among any other considerations, ergonomics militate against such a reduction in the size of cell phones. For example, the buttons in a keypad cannot be reduced further in size or placed closer together than in currently available cellular phones without substantially hampering a user's ability to quickly and accurately enter the digits of a phone number. Also, a reduction in the size of cell phones will inevitably reduce the size of the display, which is counter to the current trend of maximizing display size to facilitate multimedia and other capabilities that are being incorporated into cell phones. Furthermore, a reduction in the size of a cell phone will reduce talk time between recharges, which is unacceptable.

Furthermore, experience has shown that certain markets, such as the United States, prefer cell phones that have a certain minimum weight and size that is based predominantly on the "feel" of the phone. This preferred range of size and weight, which is reflected in phones that are currently available for the U.S., is larger and heavier than the size and weight range of phones that are sold in most Asian markets. Consequently, it is not a technological limitation, but rather human-factors issues, that restrict further reduction in the size of cell phones.

Another circumstance for which currently-available cell phones are not well suited is certain emergency situations. This is particularly ironic, since this would seem to be the raison d'etre for the cell phone—to contact help in the case of an emergency. But, the unfortunate reality is that there is a substantial likelihood that a cell phone will not be available to its hapless owner in certain emergency situations.

In particular, if the emergency arises as a result of a sports-related injury, the phone might be unavailable because, as discussed above, the injured party didn't bring it along. If the emergency arises, for example, due to a serious car accident, the phone might not be readily accessible to the accident victim because:

in the panic of the moment, the victim is disoriented and forgets where the phone is located;

it might have been unsecured on a center console or in another favored location in the car, with the result that the phone is thrown to another unknown location in the car during the accident; or the victim cannot reach the phone because they are pinned by a collapsed steering wheel, etc.

As a consequence, there is a need for a cell phone that has a form factor that is better suited for use in situations, such as those described above, in which currently available cell phones are ill-suited for use.

SUMMARY OF THE INVENTION

The present invention provides a limited-capability portable wireless terminal (e.g., cell phone, cell phone with GPS, cell phone with multimedia capability, etc.) that is particularly well adapted for use in emergency situations, recreational activities and for occasional calls.

The illustrative embodiment of the present invention is a very small wireless terminal that detaches from a larger docking device. The detachable wireless terminal typically weighs less than 25 grams and, in some embodiments, has overall dimensions of about 60 millimeters in length, 33 millimeters in width, and 15 millimeters in thickness.

In the illustrative embodiments, the detachable wireless terminal does not have a display or a numeric keypad. Rather, the detachable wireless terminal has four or five "one-touch" buttons that place a call to a pre-programmed phone number when pressed. Some of the buttons are programmable by the user (e.g., home number, local hospital, a friend, etc.). One of the buttons, which is used to place a 9-1-1 call, can be pre-programmed by the manufacturer. The buttons are large, and, in some embodiments, include an icon to indicate their functionality (e.g., call home, call 9-1-1, etc.) In some embodiments, the buttons are lit. In some other embodiments, the detachable wireless terminal includes a small display.

The detachable wireless terminal is small enough and light enough to be coupled to a lanyard, necklace, etc., and worn by a user, such as around their neck, arm, or waist, for example. This is particularly advantageous for individuals that engage in sports, wherein carrying a normal-size cell phone is often unacceptable. It is also advantageous for seniors living alone; the wireless terminal will always be accessible when needed. The detachable wireless terminal includes a small "ring" or coupler for this purpose.

Typically, users of conventional cell phones keep their phones "on," which allows them to receive calls. On the other hand, since a detachable wireless terminal in accordance with the present invention is primarily intended to place calls, not receive them, it is advantageously (but not necessarily) kept "off." This conserves power and insures that there is power when needed, such as in an emergency. Of course, a user can choose to keep the detachable wireless terminal "on." In some embodiments, the detachable wireless terminal cannot receive calls.

When not being carried by a user, the detachable wireless terminal is coupled to the docking device. In some embodiments, the docking device receives more than one detachable wireless terminal. The docking device has a more extensive and versatile user interface and is used to program the detachable wireless terminal. Items/functions that can be programmed include phone numbers for the "dedicated key" calling, call log, ring tones, passwords, codes, voice recognition tags for voice dialing, multimedia content, and the like.

Furthermore, the docking device can receive information from the detachable wireless terminal. For example, call log, voice recordings, SMS, call timer update, downloaded media contents and the like can be transmitted to the docking device.

Communications between the detachable wireless terminal and the docking station can be either wired or wireless. Embodiments that use wired communications will incorporate connectors with the necessary pin connections (e.g., USB, audio . . . , etc.) Embodiments that use wireless communications will rely on protocols such as Blue Tooth, WiFi, or infrared, etc. as the "connection." In embodiments in which communications between the detachable wireless terminal and the docking station is wireless, data exchange for programmability and even call-making capability is supported when the portable terminal is in the vicinity of the docking station (i.e., the devices need not be physically coupled).

The docking device also serves as a charger to charge a rechargeable battery within the detachable wireless terminal.

In some embodiments, the docking device is itself a suitably-configured mobile wireless terminal (e.g., cell phone, etc.). In some other embodiments, the docking device is an MP3 or multimedia player, with or without wireless capability, but suitably configured to function as a dock. In some further embodiments, the docking device is a non-portable wireless terminal. In yet further embodiments, the docking device has more limited capabilities and is simply intended to charge and store the detachable wireless terminal.

BRIEF DESCRIPTION OF THE DRAWINGS

FIG. 2A depicts a back view of a docking device in accordance with the illustrative embodiment of the present invention.

FIG. 2B depicts a front view of the docking device of FIG. 2A.

FIG. 5 depicts a view of the back side of a printed circuit board within the detachable wireless terminal of FIG. 3 and shows some of the components disposed thereon.

FIG. 6 depicts a view of the front side of the printed circuit board of FIG. 5 and shows some of the components disposed thereon.

DETAILED DESCRIPTION

Figure 1A:
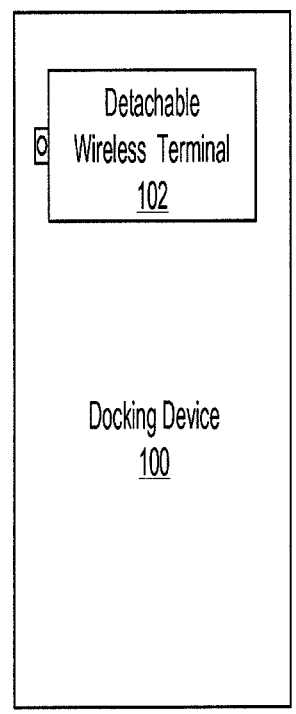
FIG. 1A depicts the salient features of a detachable wireless terminal and docking device in accordance with the illustrative embodiment of the present invention.
Figure 1B:
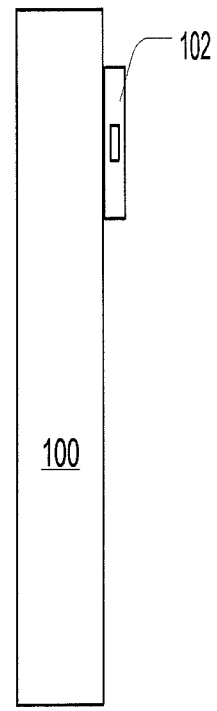
FIG. 1B depicts a side view of the detachable wireless terminal and docking device shown in FIG. 1.

FIGS. 1A and 1B depict docking device 100 and detachable wireless terminal 102 in accordance with the illustrative embodiment of the present invention. In these Figures, detachable wireless terminal 102 is coupled to docking device 100. In use, detachable wireless terminal 102 is typically detached from docking device 100 and carried by a user.

As described further below, docking device 100 includes a more extensive and versatile user interface than detachable wireless terminal 102, which has an intentionally limited user interface. As a consequence, docking device 100 is used to program detachable wireless terminal 102 (e.g., phone numbers for dedicated key calling, call log, ring tones, passwords, codes, voice recognition tags for voice dialing, multimedia content, etc.). Furthermore, in some embodiments, docking device 100 is capable of receiving and storing data from wireless terminal 102 (e.g., call log data, voice recording, SMS, call timer update, downloaded multimedia content, etc.). Also, in some embodiments, docking device 100 incorporates wireless telecommunications capabilities. Communication between docking device 100 and detachable wireless terminal 102 can be wireless or wired via a high-speed connection. Additionally, in some embodiments, docking device 100 and detachable wireless terminal 102 communicate via "walkie-talkie" mode.

Back and front views of an illustrative embodiment of docking device 100 are depicted in FIGS. 2A and 2B, respectively. In the illustrative embodiment, docking device 100 exhibits a generic form factor and incorporates a capability for wireless telecommunications, and for programming and charging detachable wireless terminal 102. As to its specific configuration and form factor, in some embodiments, docking device 100 is a mobile cellular phone that is physically adapted to receive detachable wireless terminal 102. In some other embodiments, docking device 100 is a fixed wireless desktop phone. In some further embodiments, docking device 100 is an MP3 or multimedia player, with or without wireless telecommunications capability. It is to be understood that docking device 100 can have any one of many different configurations and form factors.

As depicted in FIGS. 2A and 2B, docking device 100 comprises receiving region 204, latches 206, electrical contacts 208, high-speed digital interface 210, transceiver 212, antenna 214, processor/control circuitry and components 216, battery 218, connector 220, display 222, numeric keypad 224, additional keypad buttons 226 (e.g., send key, clear key, etc.), and navigation key 228, interrelated as shown.

Detachable wireless terminal 102 couples to docking device 100 at receiving region 204. In some embodiments, region 204 is recessed relative to the back surface of docking device 100. Latches 206 retain terminal 102 in the docking device. When docked, detachable wireless terminal 102 electrically couples (e.g., via a connector, etc.) to contacts 208. This enables detachable wireless terminal 102 to be charged via docking device 100.

High speed digital interface 210 (e.g., USB, high speed serial, etc.) facilitates wired data transfer, etc., between detachable wireless terminal 102 and docking device 100. Alternatively, data transfer can be accomplished wirelessly.

Also, in embodiments (not depicted) in which more than one detachable wireless terminal (e.g., one for each family member, etc.) is attached to the docking device, an ID code, unique for each detachable wireless terminal 102, is used to identify a particular terminal 102 to docking device 100. This identification function can be performed through a wired connection or wirelessly. In some embodiments, multiple "databases" are stored within docking device 100 for the purpose of programming multiple detachable wireless terminals 102. The combination of a wireless connection (e.g., Blue Tooth, etc.) and ID codes enable users to locate a particular misplaced terminal 102 by the push of a button.

Transceiver 212 and antenna 214 provide wireless telecommunications capabilities at radio frequencies to docking device 100 in known fashion. The wireless telecommunications capabilities can be based on any one of number of access technologies (e.g., frequency division multiple access, time-division multiple access, time-division duplex, code-division multiple access, etc.) and any modulation scheme (e.g., frequency shift keying, quadrature phase-shift keying, etc.) in accordance with any interface (e.g., IS-41, IS-54, IS-95, GSM, etc.).

Processor/control circuitry and components 216 are capable of coordinating and controlling the various components and functions of docking device 100 to:

(1) provide wireless telecommunications capability;
(2) program detachable wireless terminal 102;
(3) receive and store information from detachable wireless terminal 102, among other capabilities. Processor/control circuitry and components 216 can comprise special-purpose hardware or programmed general-purpose hardware or both.

Battery 218 is an energy-storage device (e.g., an electrochemical energy-storage device, etc.) that provides energy to processor/control circuitry and components 218 and the other components of docking device 100 in well-known fashion.

Connector 220 receives a cable that connects to AC power to charge docking device 100.

Display 222 is a visual display that enables docking device 100 to output information (e.g., text, images, video, etc.) to a user. Typically, display 222 can be illuminated to enhance viewing as desired. Numerical keypad 224 is a tactile input device that enables docking device 100 to enter digits to place a call or to program detachable wireless terminal 102. For example, phone numbers for dedicated key calling, passwords, etc. can be programmed into detachable wireless terminal 102 via keypad 224 (either wirelessly or via the high-speed digital interface 210). Additional keypad buttons 226 provide functions such as receive a call, end a call, etc. Also, they can be used to program detachable wireless terminal 102. Navigation button 228 is four-way switch that enables a user to navigate through various menus, etc. Those skilled in the art will be familiar with the design and use of numerical keypad 224, additional keypad buttons 226, and navigation button 228.

In some embodiments, docking device 100 will include a variety of other internal circuits and components, such as a speaker for outputting an acoustic signal, a microphone that receives an acoustic signal and conveys it to processor/control circuitry and components 216 for conversion to a digital signal. In view of this disclosure, those skilled in the art will know how to integrate such components and circuits into docking device 100.

Figure 3:
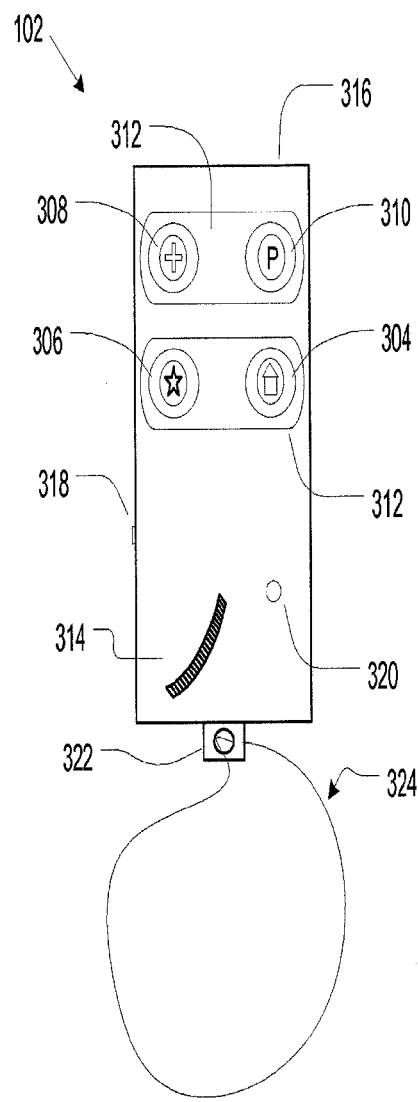
FIG. 3 depicts a first illustrative embodiment of the detachable wireless terminal of FIG. 1.

FIG. 3 depicts a first illustrative embodiment of detachable wireless terminal 102. As depicted in FIG. 3, the first illustrative embodiment has a generally rectangular shape and includes four buttons 304 through 310, recessed region 312, speaker opening 314, microphone opening 316, mode (on/off) switch 318, status (power) indicator 320, coupler 322, and lanyard 324.

Buttons 304, 306, 308, and 310 provide dedicated, one-touch, key calling. In other words, pushing any of these buttons places a call. Buttons 304, 306, and 308 are programmable by the user via, for example, docking device 100.

Each button incorporates a unique, raised icon that, is some cases, can be indicative of the party/location/service that the button is programmed to call. For example, button 304 has a "house" icon. If the user desires, they can program button 304 to place a call to their home when pressed. Button 306 has a "star" icon, which is not necessarily indicative of any particular party or service. The user could program button 306, for example, with a friend's number. Button 308 has a "hospital" icon; this button could be programmed by the user with the number of a local hospital. Button 310 has a "P" (police) icon. In some embodiments, this button is preprogrammed by the distributor/manufacturer to place a 9-1-1 call when pressed. In some embodiments, the button that is preprogrammed to call "9-1-1" is larger than the other buttons on detachable wireless terminal 102. To facilitate identification, these buttons can have appropriate coloring (e.g., "red" and "white" for the "hospital" icon, etc.) and, in some embodiments, the buttons are lit when detachable wireless terminal 102 is "on."

Buttons 304 through 310 are disposed in a recessed region 312 to facilitate locating the buttons in situations (e.g., certain emergencies, etc.) in which the buttons might not be visible to a user.

Opening 314 enables voice, etc., that is reproduced by an internal speaker (see, e.g., FIG. 5 at "534") to be heard by a user. A microphone (see, e.g., FIG. 5 at "536") is disposed within detachable wireless terminal 102 beneath microphone opening 316.

On/Off switch 318 turns detachable wireless terminal 102 "on" or "off." As previously disclosed, while most users keep their conventional cell phone "on," as is consistent with its use, detachable wireless terminal 102 is normally "off" to conserve power. Again, detachable wireless terminal 102 is primarily intended for out calling, such as in emergency situations, not for receiving calls. As a consequence, there is no reason to keep it on, and good reason to keep it off.

Status indicator 320 indicates whether detachable wireless terminal 102 is "on." Coupler 322 receives a lanyard, etc., so that it can be worn about a user's neck or wrist, or coupled to a user's belt. Alternatively, detachable wireless terminal 102 can be coupled to a bracelet, necklace, key ring, or the like that is normally worn or carried by a user.

Figure 4:
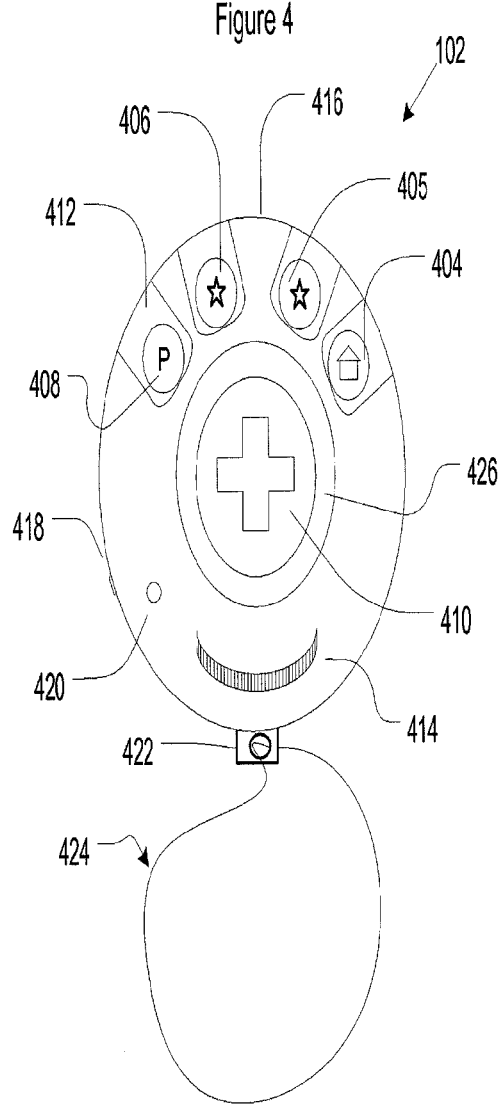
FIG. 4 depicts a second illustrative embodiment of the detachable wireless terminal of FIG. 1.

FIG. 4 depicts a second illustrative embodiment of detachable wireless terminal 102. As depicted in FIG. 4, the first illustrative embodiment has a generally circular shape and includes, five buttons 404, 405, 406, 408, and 410, recessed regions 412 and 426, speaker opening 414, microphone opening 416, mode (on/off) switch 418, status (power) indicator 420, coupler 422, and lanyard 424.

The circular form factor of the second illustrative embodiment facilitates placing a large button (e.g., larger than the other buttons), such as button 410, in the center of detachable wireless terminal 102. This button is intended for emergencies, such as would be addressed by a call to 9-1-1. The remaining four call buttons (buttons 404, 405, 406, and 408) are located along the perimeter of detachable wireless terminal 102. They are programmable in the manner previously described. The functionality of the various other elements depicted in FIG. 4 is the same as in the embodiment that is depicted in FIG. 3.

FIGS. 5 and 6 depict a simplified representation of printed circuit board 530 within detachable wireless terminal 102 and some of the components and circuits that are disposed thereon. FIG. 5, which depicts a view of the back of printed circuit board 530, depicts mode switch 320, battery 532, speaker 534, microphone 536, and internal antenna 538. FIG. 6, which depicts a view of the front of printed circuit board 530, depicts Subscriber Identity Module 640, GSM module 642, and connector 644.

Mode switch 320 is an "on/off" switch, which has previously been described. Battery 532, which is typically a lithium-ion rechargeable battery, powers the various circuits and components of detachable wireless terminal 102. Speaker 534 outputs an acoustic signal and microphone 536 receives an acoustic signal and conveys it to the appropriate circuitry for conversion to a digital signal, in known fashion. Internal antenna 538 is used in conjunction with a transceiver in GSM module 642 to facilitate wireless telecommunication.

In the illustrative embodiment, detachable wireless terminal 102 is depicted as a GSM-compliant wireless terminal, and therefore includes Subscriber Identity Module ("SIM card") 640.

SIM card 640 is a "smart card" that holds all of a subscriber's personal information, the phone number, phone settings, personal security key, and other data necessary for a GSM-compliant wireless terminal to function. Essentially, it is the subscriber's authorization to use the wireless network. SIM card 640 requires a SIM card reader, which is incorporated in GSM module 642. The SIM card reader reads the subscriber information that is contained on the SIM card. This information is then transmitted to the network.

GSM module 642 includes a transceiver for supporting wireless telecommunications and a processor, memory, and circuitry for controlling the various circuits and components within detachable wireless terminal 102.

In some other embodiments, detachable wireless terminal 102 is not GSM compliant. In such embodiments, a SIM card might not be provided (some regions do use a SIM card with CDMA) and the GSM module is not included (since a different wireless interface technology is used). In such embodiments, GSM module 642 is replaced with substantially analogous circuitry and components, such as a transceiver, a processor, memory, etc. to control the detachable wireless terminal 102. To the extent a SIM card is not used, much of the information and functionality that would otherwise be provided in the SIM card is contained in the memory and logic of the processor and circuitry that replaces GSM module 642. Connector 644 can be used to charge battery 532, in addition to charging via docking device 100.

In some embodiments, detachable wireless terminal 102 supports other functions, such as, without limitation: garage door opener, car-key remote, and RFID applications (e.g., access to a building, transportation passes, etc.) and "contactless" payment features similar to PayPass® (e.g., provides credit-card holders with a simpler way to pay by tapping a device on a point-of-sale terminal reader rather than swiping or inserting a credit card). Those skilled in the art, after reading the present disclosure, will know how to incorporate RFID technology or other appropriate technology to provide such other features.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

The invention claimed is:

1. An apparatus, comprising:
a wireless terminal, capable of coupling to a docking device, and configured to enable two-way voice communications independent of the docking device over a common wireless network, the wireless terminal comprising:
a first button configured to, in response to being depressed, activate a call to a preprogrammed number,
a second button configured to, in response to being depressed, activate a call to a user preprogrammed number received from the docking device, the user preprogrammed number entered via the docking device, and
an interface configured to transmit data to and receive data from a wireless telecommunications antenna and transceiver of the docking device; and
wherein the wireless terminal and the docking device are capable of coupling in a walkie-talkie mode.

2. The apparatus of claim 1, wherein the docking device comprises:
a suitably-programmed processor; and
control circuitry configured for programming the wireless terminal.

3. The apparatus of claim 1, wherein the docking device comprises a mobile phone.

4. The apparatus of claim 1, wherein the wireless terminal further comprises a plurality of buttons for placing calls.

5. The apparatus of claim 4, wherein the first button is visually distinguishable from the plurality of buttons.

6. The apparatus of claim 1, wherein the interface of the wireless terminal comprises a wireless interface and a port.

7. The apparatus of claim 1, wherein the wireless terminal further comprises a coupler capable of coupling the wireless terminal to an item that facilitates carrying the wireless terminal.

8. The apparatus of claim 7, wherein the item is selected from a group comprising a lanyard, a necklace, a bracelet, a key-ring, and a belt.

9. An apparatus, comprising:
a plurality of wireless terminals, capable of coupling to a docking device, and configured to enable two-way voice communications independent of the docking device over a common wireless network, a wireless terminal of the plurality of wireless terminals comprising:
a first button configured to, in response to being depressed, activate a preprogrammed call,
a second button configured to, in response to being depressed, activate a call to a user preprogrammed number received from the docking device, the user preprogrammed number entered via the docking device,
an interface configured to transmit data to and receive data from a wireless telecommunications antenna and transceiver of the docking device; and
wherein the plurality of wireless terminals and the docking device are capable of coupling in a walkie-talkie mode.

10. The apparatus of claim 9, wherein the wireless terminal does not have a display.

11. The apparatus of claim 9, wherein the first button is visually distinguishable from other buttons.

12. The apparatus of claim 9, wherein the wireless terminal of the plurality of wireless terminals further comprises a coupler capable of coupling the wireless terminal to an item that facilitates carrying the wireless terminal, wherein the item is selected from a group comprising a lanyard, a necklace, a bracelet, a key-ring, and a belt.

13. The apparatus of claim 9, wherein the interface of the wireless terminal is selected from a group comprising a wireless interface and a port.

14. The apparatus of claim 9, wherein the mobile docking device is selected from a group comprising a cellular phone and an MP3 player with wireless telecommunications capability.

15. The apparatus of claim 1, wherein the wireless terminal is configured to program the second button.

16. The apparatus of claim 1, wherein the docking device is configured to program the second button.

17. The apparatus of claim 1, wherein the preprogrammed number comprises a manufacturer preprogrammed number.

18. The apparatus of claim 1,
   wherein the docking device comprises a second interface configured to enter a user programmed number and to transmit the user programmed number; and
   wherein the wireless telecommunications antenna and transceiver of the docking device is configured to enable two-way communications.

\* \* \* \* \*